(12) United States Patent
Yamano

(10) Patent No.: US 6,547,568 B1
(45) Date of Patent: Apr. 15, 2003

(54) EDUCATION INTERMEDIARY SYSTEM AND METHOD

(76) Inventor: Kiyokazu Yamano, 5F, No. 48, Ming Chuan W. Rd., Taipei (TW)

( * ) Notice: Subject to any disclaimer, the term of this patent is extended or adjusted under 35 U.S.C. 154(b) by 164 days.

(21) Appl. No.: 09/687,773

(22) Filed: Oct. 12, 2000

(51) Int. Cl.[7] .................................................. G09B 7/00
(52) U.S. Cl. ...................... 434/323; 434/322; 434/362; 434/350; 706/927
(58) Field of Search .................................. 434/322, 118, 434/323, 362, 350; 705/52; 706/927; 709/228, 227, 204; 463/42

(56) References Cited

U.S. PATENT DOCUMENTS

| | | | | |
|---|---|---|---|---|
| 5,558,521 A | * | 9/1996 | Clark et al. ............. | 434/322 X |
| 5,828,843 A | * | 10/1998 | Grimm et al. ............. | 709/228 |
| 5,894,556 A | * | 4/1999 | Grimm et al. ............. | 709/227 |
| 6,021,119 A | * | 1/2000 | Derks et al. ............. | 370/261 X |
| 6,023,729 A | * | 2/2000 | Samuel et al. ........... | 709/228 X |
| 6,029,043 A | * | 2/2000 | Ho et al. ................. | 434/350 X |
| 6,128,660 A | * | 10/2000 | Grimm et al. .......... | 709/227 X |
| 6,325,632 B1 | * | 12/2001 | Chao et al. ............. | 434/322 X |
| 6,374,237 B1 | * | 4/2002 | Reese ............................ | 707/3 |

* cited by examiner

Primary Examiner—S. Thomas Hughes
Assistant Examiner—Chanda L. Harris
(74) Attorney, Agent, or Firm—LaRiviere, Grubman & Payne, LLP

(57) ABSTRACT

The education intermediary system and method for facilitating an interested learner to have a worldwide choice of an instructor who is best matched with his expectations are disclosed. The education intermediary system comprises a first database and a first processing means. The first database contains data of a plurality of instructors. The first processing means receives a first set of data inputted by an interested learner and, based on selection criteria containing the first set of data, selects from the first database an instructor who is best matched with the selection criteria, and provides from the first database at least part of the data of the selected instructor to the interested learner.

9 Claims, 4 Drawing Sheets

EDUCATION INTERMEDIARY SYSTEM AND METHOD

BACKGROUND OF THE INVENTION

In addition to regular education provided by the schools, mentoring education for students after-school and extension education for the general public are also playing important roles in education sector. However, current mentoring education and extension education have the following problems to be overcome:

First, an interested learner can hardly find a suitable instructor. Most mentoring or extension education institutes provide very few experienced instructions or tutors. Therefore, it is very hard for an interested learner to find a suitable instructor. Although some mentoring or extension education institutes utilize many channels to recruit more instructor, they do not have a system or method to help an interested learner select his expected instructor.

Second, the courses of study provided by mentoring and extension education institutes are too limited to meet the requirements of interested learners. They merely provide common study courses, such as mathematics, English, Japanese, etc. If a student after-school needs to be taught on history, geography, biology, sociology, or other specific courses, he/she will hardly find a mentoring education institute that can meet his/her requirements. Similarly, if a person wants to study a specific language, such as one from Korea, India, or the Netherlands, he/she will also hardly find an extension education institute that can meet his/her requirements.

Therefore, for mentoring and extension education, a sound system and an effective method that not only can provide extensive courses of study to meet interested learners requirements but also can help them easily find an able, experienced and suitable instructor are extremely needed.

SUMMARY OF THE INVENTION

The education intermediary system and method of the present invention not only can let an interested learner have a worldwide choice of instructors who are best matched with his/her expectations but also can provide extensive courses of study to meet individual requirement of interested learners.

The education intermediary system of the present invention comprises a first database and a first processing means. The first database contains data of a plurality of instructors. The first processing means receives a first set of data inputted by an interested learner, then, based on selection criteria containing the first set of data, selects from the first database an instructor who is best matched with the selection criteria, and provides at least part of the data of the selected instructor to the interested learner.

The education intermediary method of the present invention comprises the following steps:

providing a host computer having a first processing means and a first database, wherein the first database contains data of a plurality of instructors;

receiving, by the host computer, a first set of data inputted by an interested learner;

selecting, by the first processing means, from the first database an instructor who is best matched with selection criteria containing the first set of data; and providing from the first database at least part of the data of the selected instructor to the interested learner.

BRIEF DESCRIPTION OF THE DRAWINGS

Other features and advantages of the present invention will shown in the following descriptions taken in conjunction with the accompanying drawings, wherein.

REFERENCE NUMERALS FOR THE PARTS

10 Education Intermediary System
11 Interested Learner
12 First Processing Means
13 First Database
14 Second Processing Means
15 Second Database
16 Third Processing Means
17 Third Database
18 Forth Processing Means
19 Potential Instructor
20 Fifth Processing Means

DETAILED DESCRIPTION OF THE INVENTION

Figure 1:
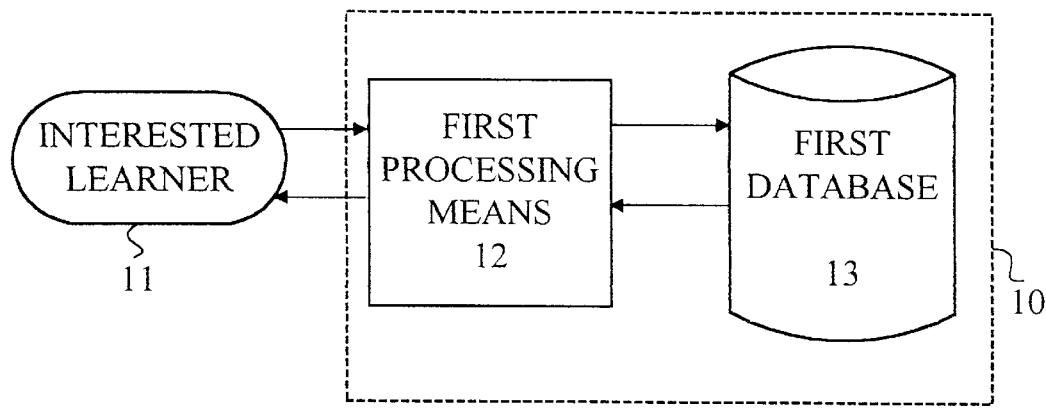
FIG. 1 shows a block diagram of the first embodiment of the present invention.

FIG. 1 illustrates the first embodiment of the present invention. The education intermediary system 10, shown in FIG. 1, mainly comprises a first processing means 12 and a first database 13. The first database 13 contains data of instructors, such as their nationality, sex, professional background, previous experience, etc. In addition, if required, the first database 13 may contain subjective data of instructors, such as teaching capability and attitude (strictness or kindness), etc. The above-mentioned subjective data may be obtained by investigating and statistically analyzing the feedbacks from learners.

In the first embodiment of the present invention, an interested learner 11 inputs a first set of data to the education intermediary system 10. The first set of data mainly comprises the interested learner's expectations for an instructor. A first processing means 12 receives the first set of data and adds the first set of data into selection criteria. Then, based on the selection criteria, the first processing means 12 selects from the first database 13 an instructor who is best matched with the selection criteria. Finally, the first processing means 12 provides the result of selection as well as at least part of the data of the selected instructor to the interested learner 11.

The education intermediary system 10 according to the first embodiment of the present invention can help an interested learner find a good instructor according to his expectations. In addition, the present invention is not limited to specific teaching modes or specific recruiting channels. Therefore, the present invention can utilize all the possible recruiting channels to recruit instructors of different teaching modes (such as teaching in a small class, one-on-one teaching, network teaching, teaching in different time periods, etc.) and of different courses. The present invention also can be based on an interested learner's specific requirements to recruit an instructor who meets those requirements. Therefore, the present invention not only can help an interested learner easily find an instructor who is matched with the interested learner's expectations but also can provide extensive courses of study to meet different requirements of the interested learners.

Figure 2:
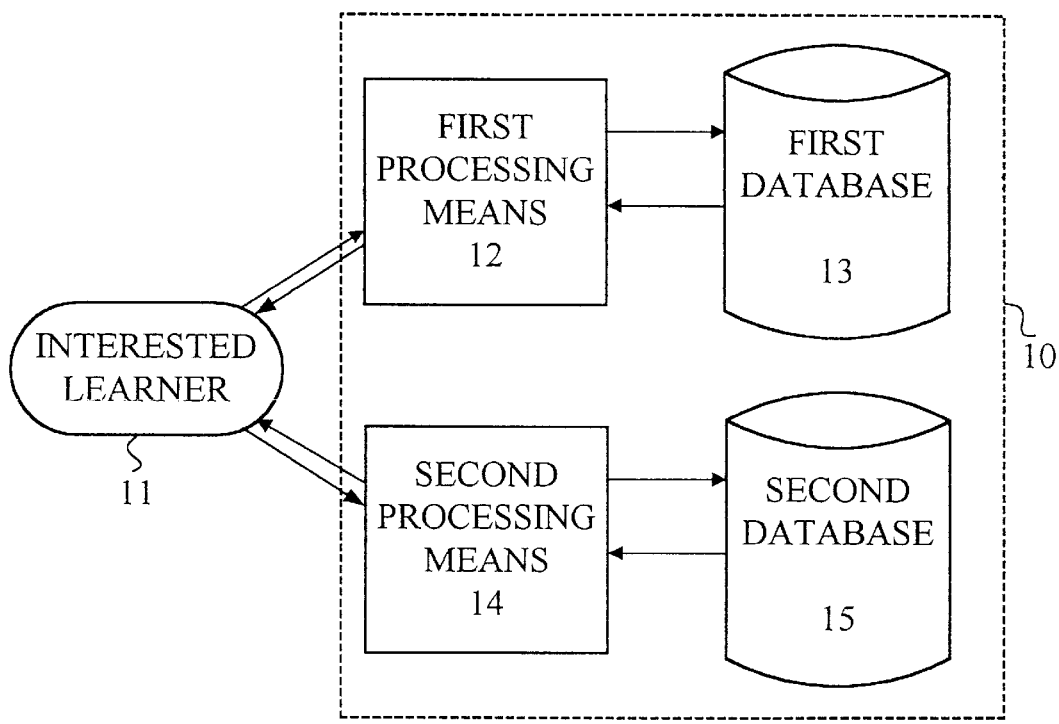
FIG. 2 shows a block diagram of the second embodiment of the present invention.

As illustrated in FIG. 2, the education intermediary system 10 of the present invention can further comprise a second processing means 14 and a second database 15. The second database 15 contains a plurality of educational attainment evaluating tests. The second processing means 14 can, based on a second set of data inputted by the interested learner 11, select from the second database 15 an educational attainment evaluating test that is suitable for the interested learner 11, and provide the selected test to the interested learner 11. The second set of data may comprise the interested learner's age, educational background, interested course(s) of study, etc. The second embodiment of the present invention, as illustrated in FIG. 2, can further provide an interested learner with an educational attainment evaluating test that is matched with the interested learner's age and educational background, so that the educational attainment of the interested learner can be evaluated before he/she attends the course.

Figure 3:
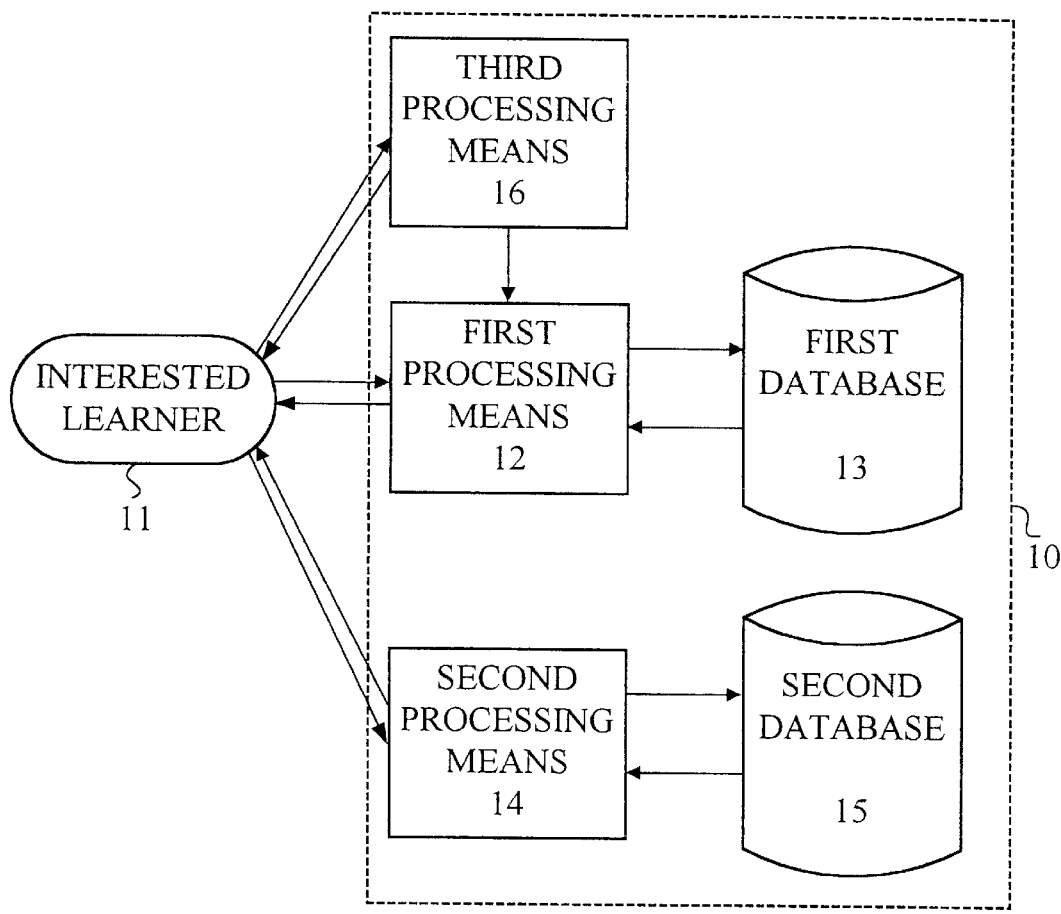
FIG. 3 shows a block diagram of the third embodiment of the present invention.

As shown in FIG. 3, the education intermediary system 10 of the present invention can further comprise a third processing means 16 which can receive from the interested learner 11 answers to the selected educational attainment evaluating test, and, based on the answers, determine the result of educational attainment evaluation, provide the determined result to the interested learner 11, and add the determined result into the selection criteria. Therefore, the selection criteria contain not only the interested learner's expectations for an instructor but also the data of the educational attainment of the interested learner 11 himself. Therefore, the instructor selected based on the criteria not only can meet the requirements of the interested learner 11 but also can match with the educational attainment of the interested learner 11.

Figure 4:
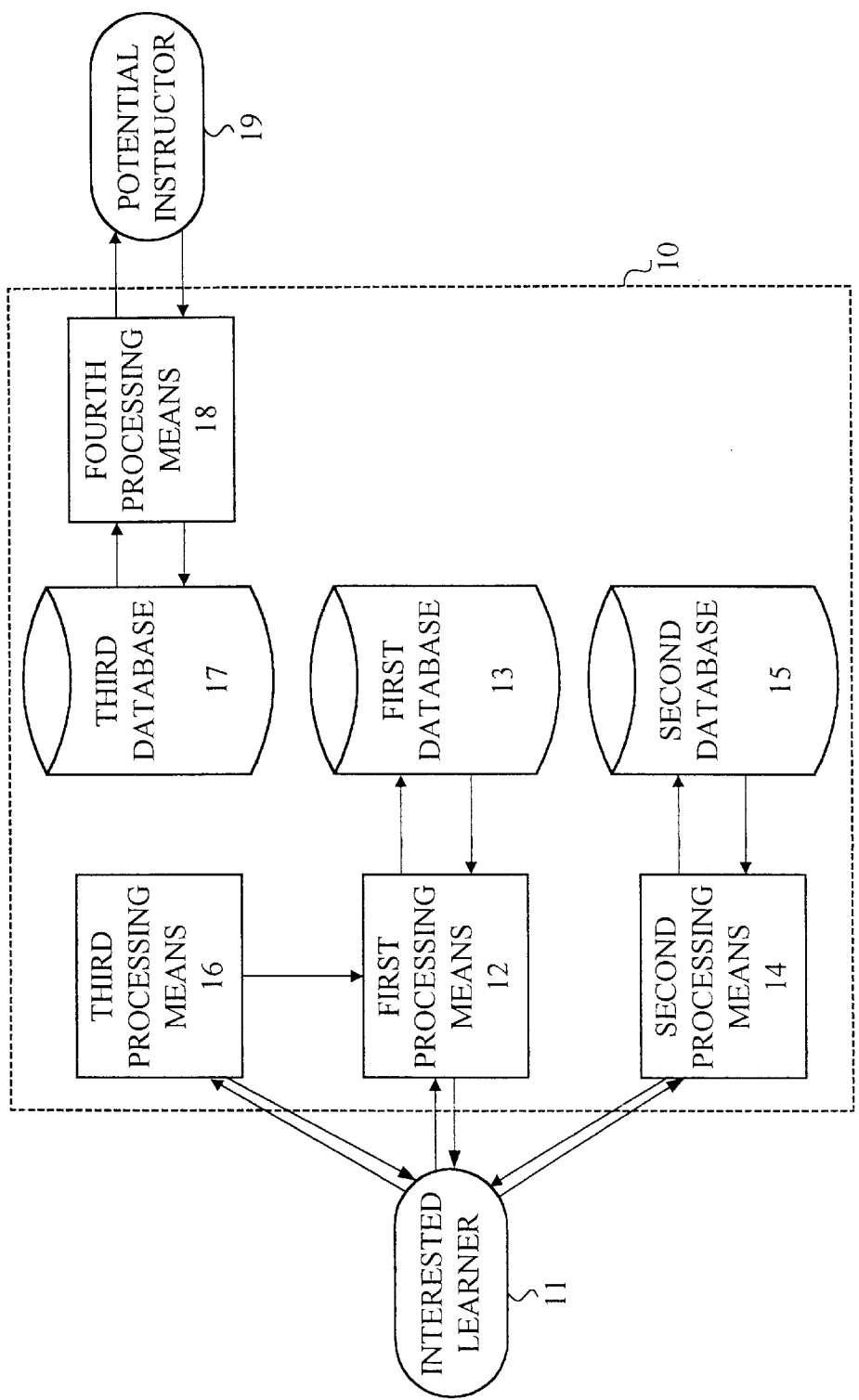
FIG. 4 shows a block diagram of the forth embodiment of the present invention.

As illustrated in FIG. 4, the education intermediary system 10 of the present invention can further comprise a forth processing means 18 and a third database 17. The third database 17 contains a plurality of instructor evaluating tests. The forth processing means 18 can receive data inputted by a potential instructor 19 and, based on the data, select from the third database 17 an instructor evaluating test which is suitable for the potential instructor 19 and provides the selected instructor evaluating test to the potential instructor 19. The data inputted by a potential instructor 19 may comprise his/her name, nationality, sex, professional background, previous experience as an instructor, course(s) that he/she is capable to instruct, etc. The forth embodiment shown in FIG. 4 can further provide a potential instructor 19 with an instructor evaluating test that is matched with his conditions, so as to evaluate whether the potential instructor 19 is qualified or not.

Figure 5:
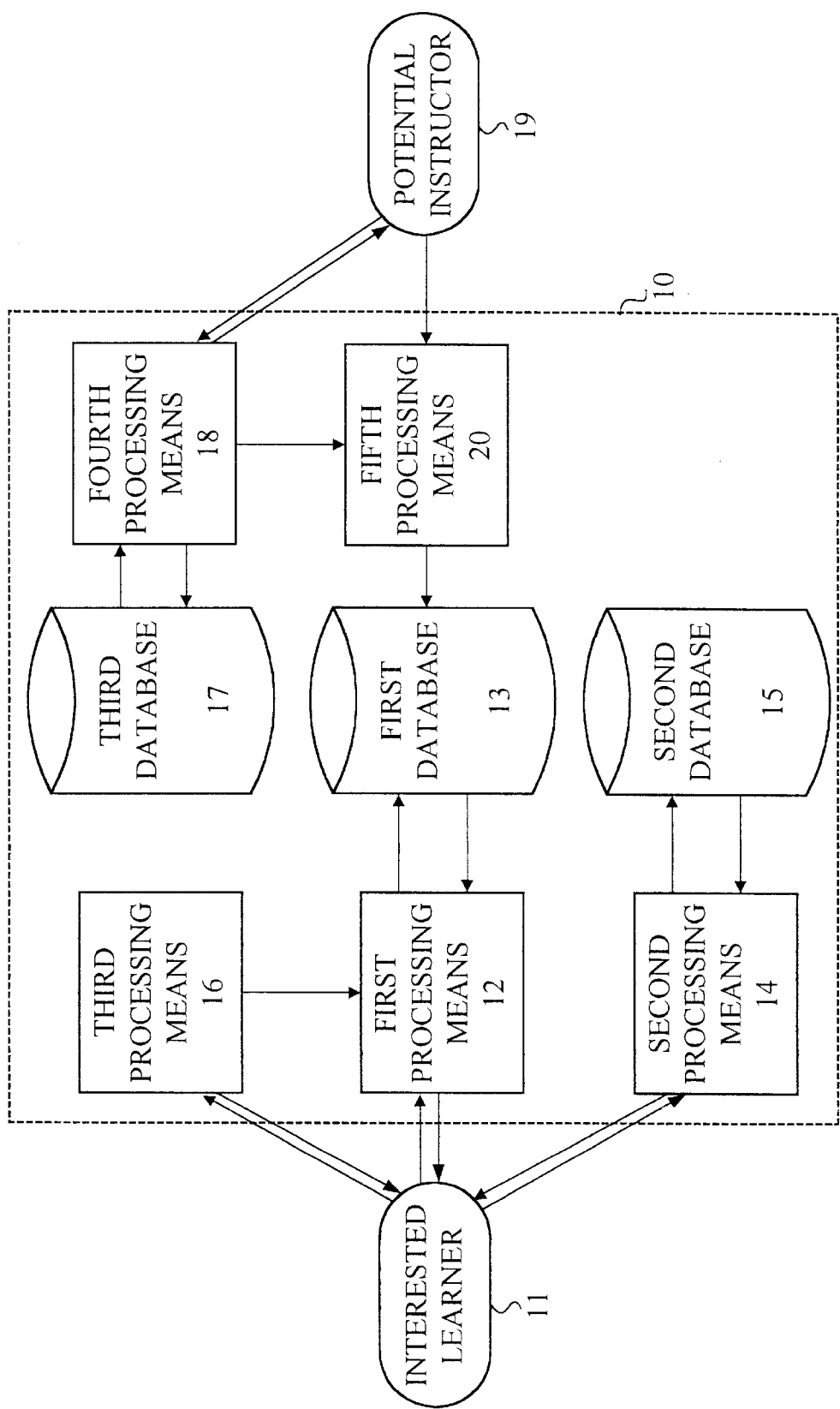
FIG. 5 shows a block diagram of the fifth embodiment of the present invention.

As shown in FIG. 5, the education intermediary system 10 of the present invention can further comprise a fifth processing means 20 which can receive from the potential instructor 19 answers to the selected instructor evaluating test and, based on the answers, determine whether the potential instructor 19 is qualified or not, and add data of the potential instructor 19 into the first database 13 if the potential instructor 19 is determined qualified.

The first processing means 12, second processing means 14, third processing means 16, forth processing means 18 and fifth processing means 20 can be integrated into a host computer. In addition, in other embodiments, those processing means can be implemented by software.

Furthermore, in other embodiments, the interested learner 11 and/or the potential instructor 19 can access the education intermediary system 10 via internet.

The technical features and contents of the present invention have been fully disclosed as above. However, various modifications or replacements can be made by persons skilled in the art based on the disclosure and teaching of the present invention without departing the spirit of the present invention. Therefore, the scope of the present invention shall not be limited to the above-disclosed embodiments and should include those modifications and replacements.

What is claimed is:

1. An education intermediary system comprising:
    first database containing data of a plurality of instructors;
    a first processing means for processing a matching process and for receiving a first set of data inputted by an interested learner;
    a second database containing a plurality of educational attainment evaluating tests;
    a second processing means for receiving a second set of data inputted by said interested learner and, based on said second set of data, selecting from said second database an educational attainment evaluating test which is suitable for said interested learner and providing the selected educational attainment evaluating test to said interested learner;
    a third processing means for receiving from said interested learner answers to said selected educational attainment evaluating test and, based on said answers, determining a result of educational attainment evaluation and providing the determined result to said interested learner;
    a third database containing a plurality of instructor evaluating tests;
    a fourth processing means for receiving data inputted by a potential instructor and, based on said data, selecting from said third database an instructor evaluating test which is suitable for said potential instructor and providing the selected instructor evaluating test to said potential instructor; and
    wherein, based on selection criteria containing said first set of data inputted by said interested learner and said determined result from said third processing means, said first processing means selects from said first database an instructor who is best matched with said selection criteria and provides from said first database at least part of the data of the selected instructor to said interested learner.

2. The education intermediary system set forth in claim 1 further comprising:
    a fifth processing means for receiving from said potential instructor answers to said selected instructor evaluating test and, based on said answers, determining whether said potential instructor is qualified or not, and adding the data of said potential instructor into said first database if said potential instructor is determined qualified.

3. The education intermediary system set forth in claim 2, wherein said first, second, third, forth and fifth processing means can be integrated into a host computer.

4. The education intermediary system set forth in claim 3, wherein said first, second, third, forth and fifth processing means can be implemented by software.

5. The education intermediary system set forth in claim 4, wherein said interested learner and/or said potential instructor can access said education intermediary system via internet.

6. An education intermediary method comprising the following steps:

provide a host computer having a first processing means, a first database containing data of a plurality of instructors, a second database containing a plurality of educational attainment evaluating tests, a second processing means, a third processing means, a third database containing a plurality of instructor evaluating tests and a fourth processing means;

receiving, by said host computer, data inputted by a potential instructor;

selecting, by said fourth processing means, from said third database an instructor evaluating test which is suitable for said potential instructor based on said data;

providing the selected instructor evaluating test to said potential instructor;

receiving, by said host computer, a first set of data inputted by an interested learner;

receiving, by said host computer, a second set of data inputted by said interested learner;

selecting, by said second processing means, from said second database, an educational attainment evaluating test which is suitable for said interested learner based on said second set of data;

providing the selected educational attainment evaluating test to said interested learner;

receiving, by said host computer, from said interested learner answers to said selected educational attainment evaluating test;

determining, by said third processing means, a result of educational attainment evaluation based on said answers;

providing the determined result to said interested learner;

selecting, by said first processing means, from said first database an instructor who is best matched with selection criteria containing said first set of data inputted by said interested learner and said determined result from said third processing means; and providing from said first database at least part of the data of the selected instructor to said interested learner.

7. The method set forth in claim 6, wherein said host computer further comprises a fifth processing means, and after providing the selected instructor evaluating test to said potential instructor, said method further comprising the following steps:

receiving, by said host computer, from said potential instructor answers to said selected instructor evaluating test;

determining, by said fifth processing means, whether said potential instructor is qualified or not based on said answers; and adding data of said potential instructor into said first database if said potential instructor is determined qualified.

8. The education intermediary method set forth in claim 7, wherein said first, second, third, forth and fifth processing means can be implemented by software.

9. The education intermediary method set forth in claim 8, wherein said interested learner and/or said potential instructor can access said host computer via internet.

* * * * *